(12) United States Patent
Kowalewski et al.

(10) Patent No.: US 10,837,496 B2
(45) Date of Patent: Nov. 17, 2020

(54) GEARBOX AND DISASSEMBLY METHOD FOR DISENGAGING A DRIVE SHAFT IN SUCH A GEARBOX

(71) Applicant: GE AVIO S.R.L., Rivalta di Torino (IT)

(72) Inventors: Tomasz Kowalewski, Rivalta di Torino (IT); Ivan Borra, Savigliano (IT); Gian Mario Bragallini, Rivalta di Torino (IT); Vincenzo Giordano, Rivalta di Torino (IT)

(73) Assignee: GE AVIO S.r.l., Rivalta di Torino (IT)

( * ) Notice: Subject to any disclaimer, the term of this patent is extended or adjusted under 35 U.S.C. 154(b) by 1304 days.

(21) Appl. No.: 14/908,508

(22) PCT Filed: Jul. 29, 2014

(86) PCT No.: PCT/IB2014/063526
§ 371 (c)(1),
(2) Date: Jan. 28, 2016

(87) PCT Pub. No.: WO2015/015425
PCT Pub. Date: Feb. 5, 2015

(65) Prior Publication Data
US 2016/0169289 A1 Jun. 16, 2016

(30) Foreign Application Priority Data
Jul. 29, 2013 (IT) .............................. TO2013A0636

(51) Int. Cl.
*F16H 1/14* (2006.01)
*F02C 7/32* (2006.01)
(Continued)

(52) U.S. Cl.
CPC ................ *F16D 1/108* (2013.01); *F02C 7/32* (2013.01); *F16D 1/0876* (2013.01); *F16D 1/10* (2013.01); *F16H 1/14* (2013.01); *F05D 2230/70* (2013.01)

(58) Field of Classification Search
CPC .......... F16D 1/108; F16D 1/0876; F16D 1/10; F02C 7/32; F16H 1/14; F05D 2230/70
(Continued)

(56) References Cited

U.S. PATENT DOCUMENTS

| 3,631,735 A | 1/1972 | McCarty |
| 3,688,560 A * | 9/1972 | Broman .................... F16H 1/14 |
| | | 74/15.63 |

(Continued)

FOREIGN PATENT DOCUMENTS

| EP | 2 505 860 A2 | 10/2012 |
| RU | 2302541 C2 | 7/2007 |
| WO | 99/47799 A1 | 9/1999 |

OTHER PUBLICATIONS

Russian Search Report dated Apr. 2, 2018 as received in Application No. 2016106716.

*Primary Examiner* — Ha Dinh Ho
(74) *Attorney, Agent, or Firm* — McGarry Bair PC

(57) ABSTRACT

A gearbox has a main unit and a secondary unit provided with respective casings of respective gear transmissions and with respective hollow shafts connected by means of a drive shaft; the secondary unit transfers motion between two axes forming an angle of less than 180° and which can be removed after having released the drive shaft; the drive shaft is engaged in an angularly fixed and axially sliding manner to the hollow shafts and is axially locked, at least in one direction, by means of an axial retaining device, which is releasable; the axial retaining device is coupled to one of the hollow shafts, at an axial end which is facing towards the
(Continued)

other of the hollow shafts; at least one opening may be formed between the two casings, so as to access such an axial end and release the axial retaining device.

15 Claims, 6 Drawing Sheets

(51) Int. Cl.
  *F16D 1/108* (2006.01)
  *F16D 1/10* (2006.01)
  *F16D 1/08* (2006.01)
(58) Field of Classification Search
  USPC .......................................................... 74/640
  See application file for complete search history.

(56) References Cited

U.S. PATENT DOCUMENTS

| | | | |
|---|---|---|---|
| 4,566,296 A | | 1/1986 | Kochakis |
| 6,058,791 A | * | 5/2000 | Brunet ...................... F02C 7/32 |
| | | | 192/69.9 |
| 7,552,591 B2 | * | 6/2009 | Bart .......................... F02C 7/32 |
| | | | 60/792 |
| 8,015,828 B2 | * | 9/2011 | Moniz ....................... F02C 7/32 |
| | | | 60/786 |
| 9,677,415 B2 | * | 6/2017 | Moliner-Cantos ........................... |
| | | | H02K 7/1823 |
| 9,850,820 B2 | * | 12/2017 | Pettinotti ................. F02C 7/36 |
| 9,982,556 B2 | * | 5/2018 | Lepretre ................ F01D 15/12 |

* cited by examiner

GEARBOX AND DISASSEMBLY METHOD FOR DISENGAGING A DRIVE SHAFT IN SUCH A GEARBOX

TECHNICAL FIELD

The present invention relates to a gearbox, in particular for turbofan jet engines in aeronautic applications.

BACKGROUND ART

Some engines of such a type have a gearbox comprising a secondary unit, of the bevel gear type, for transferring the motion between two inclined axes; and a main unit, which is connected to the secondary unit by means of a drive shaft. In particular, the ends of such a drive shaft are coupled, respectively, to hollow shafts belonging to the two aforesaid units.

The hollow shaft of the main unit actuates an accessory assembly, arranged on the axial end opposite to the one into which the drive shaft is inserted. In other words, the main unit is axially interposed between the accessory assembly and the drive shaft.

During maintenance operations, the gearbox is disassembled so as to be able to remove and/or treat the two units separately. Therefore, during disassembly, the drive shaft must be disengaged from the secondary unit. In particular, in the engines described above, the drive shaft is axially extracted through the hollow shaft of the main unit, operating from the accessory assembly side, after having disengaged and removed the latter from the main unit.

However, this solution has some drawbacks. Indeed, the need to disengage and remove the accessory assembly implies relative long disassembly and maintenance times. Furthermore, relatively large axial clearance is required at the side of the main unit in order to be able to gain easy access to the corresponding hollow shaft to disengage and extract the drive shaft outwards.

In order to at least partially solve these drawbacks, the drive shaft in other turbofan jet engines is constituted by three or more pieces, which are fixed to one another, e.g. by means of bolts, which may be disengaged to disassemble and remove the drive shaft without need to remove the latter axially through the main unit. However, the fact of making the drive shaft in several pieces complicates the making and assembly and the drive shaft itself. Therefore this type of solution is not very satisfactory.

In U.S. Pat. No. 3,631,735, which corresponds to the preamble of claim 1, the drive shaft comprises a splined portion which engages the hollow shaft of the main unit and is arranged in axial abutment against a ring arranged in a groove of such a hollow shaft. In use, such a ring prevents the drive shaft from being extracted from the hollow shaft of the main unit.

During disassembly, after having translated a cover, the ring can be accessed to be removed. After having removed the ring, the drive shaft is extracted from the hollow shaft of the main unit and remains coupled to the secondary unit only. However, as mentioned above, it is preferable to disengage the drive shaft out of the secondary unit, especially when it is the latter which is usually removed.

DISCLOSURE OF INVENTION

It is the object of the present invention to make a gearbox which allows to solve the problems illustrated above in simple, cost-effective manner.

According to the present invention, a gearbox is provided, as disclosed in claim 1.

According to the present invention, a disassembly method for disengaging a drive shaft in such a gearbox is also provided, as disclosed in claim 13.

BRIEF DESCRIPTION OF THE DRAWINGS

The invention will now be described with reference to the appended drawings which illustrate a non-limitative embodiment thereof, in which.

BEST MODE FOR CARRYING OUT THE INVENTION

Figure 1:
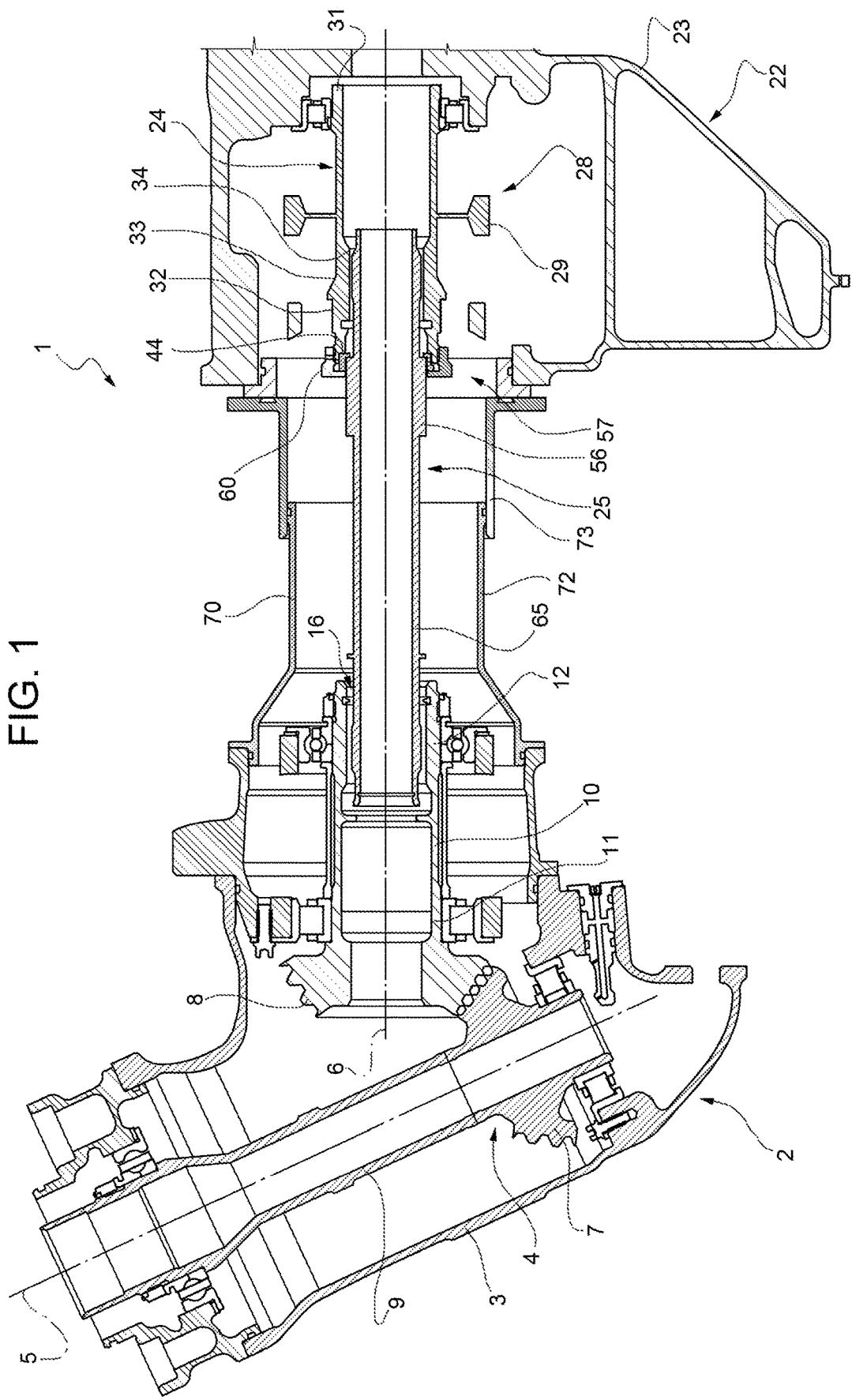
FIG. 1 shows a partial, simplified cross section of a preferred embodiment of the gearbox according to the present invention.

With reference to FIG. 1, reference numeral 1 indicates, as a whole, a gearbox (shown partially and in simplified manner), in particular for a turbofan jet engine in aeronautic applications.

The gearbox 1 comprises a module or unit 2, generally indicated as "transfer gearbox" and comprising, in turn, a casing 3 and a gear transmission 4, which transmits motion between two inclined axes 5,6, i.e. which define an angle of less than 180° between each other. In order to perform this function, the transmission 4 is preferably defined by two bevel gears 7,8 which mesh each other.

The casing 3 is preferably constituted by several pieces fixed to one another, and houses the transmission 4 and two shafts 9,10, which are supported by the casing 3 in known manner by means of rolling bearings. The shaft 9 extends along axis 5, defines a motion inlet, and supports the gear 7 in fixed position at an axial end thereof. The shaft 10, instead, extends along axis 6, defines a motion outlet, is axially hollow, is preferably made in one piece and axially ends with a portion 11 which is fixed with respect to the gear 8. Preferably, the gear 8 is made in only one piece with the portion 11.

Figure 3:
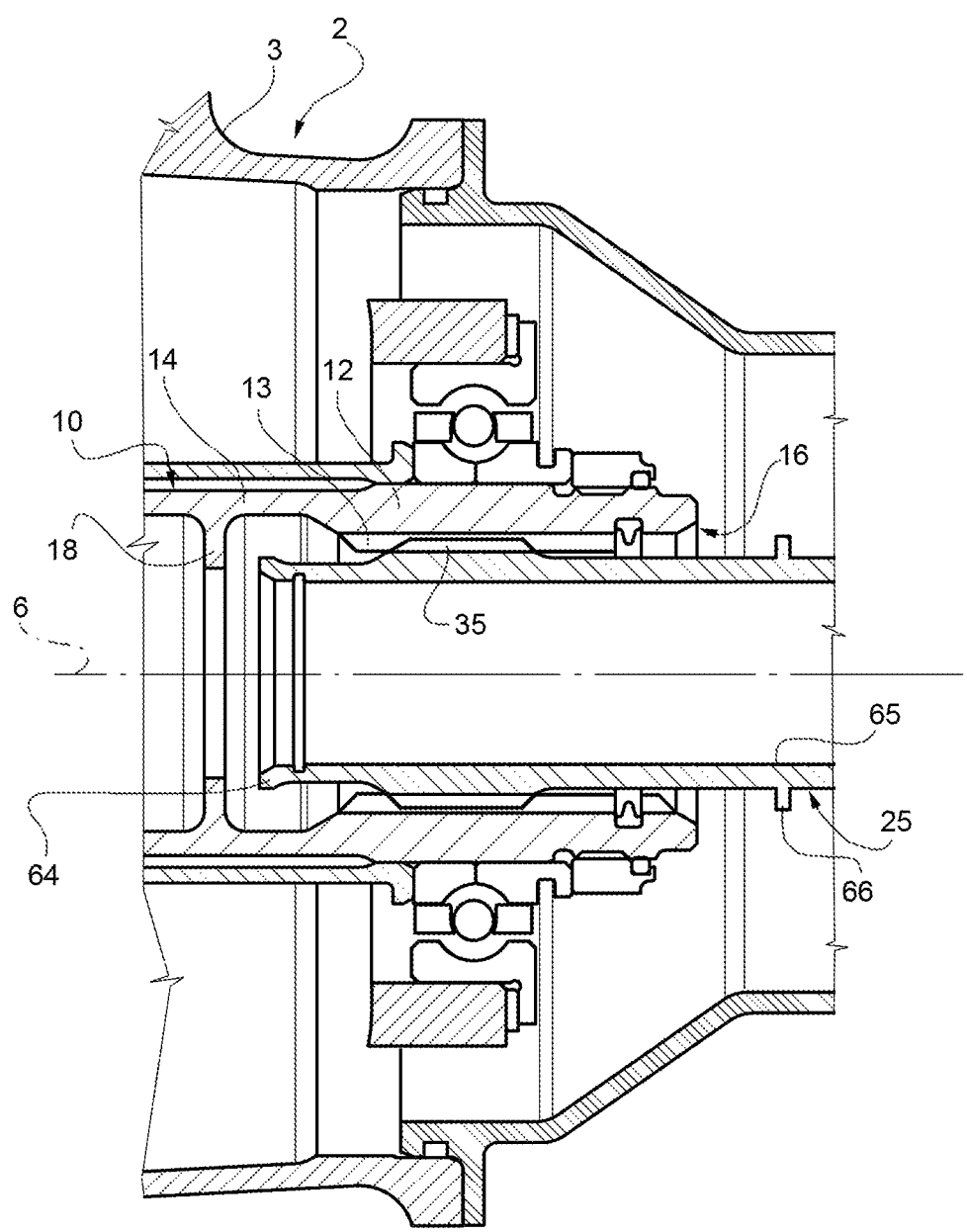

With reference to FIG. 3, the shaft 10 ends on the end opposite to portion 11 with a portion 12, which defines an axial mouth 16 of the shaft 10, has a clutch, radially inwards, preferably defined by a hole spline 13, and is joined to the portion 11 by means of an intermediate portion 14.

Furthermore, the shaft 10 comprises an inner projection 18, preferably defined by an annular flange, which radially projects from the portion 14 and has a function which will be described below.

With reference again to the FIG. 1, the gearbox 1 comprises a module or unit 22 (partially shown) generally indicated as "accessory gearbox", and comprising, in turn, a casing 23 and a shaft 24, which extends along axis 6 within the casing 23, is axially hollow and is connected to the shaft 10 by means of a coaxial drive shaft 25.

The shaft 24 defines a motion inlet for a gear transmission 28 of the unit 22. The accompanying figures show only one of the transmission gears 28, i.e. a gear which is indicated by reference numeral 29 and which is fitted onto shaft 24. In particular, the unit 22 is axially arranged between the shaft 25 and an accessory assembly (not shown), which is fixed to the casing 23 and is actuated (in manner not shown) either by the transmission 28 or by the shaft 24.

The shaft 24 axially ends, towards the accessory assembly, with a portion 31 and, towards the unit 2, with a portion 32, and comprises an intermediate portion 33 which has a clutch, radially inwards, also preferably defined by a hole spline 34. The hole splines 13 and 34 are engaged in an angularly fixed and axially slidable manner by shaft splines, defined by a portion 35 (FIG. 3) and by a portion 36 (FIG. 2) of the shaft 25, respectively.

Figure 2:
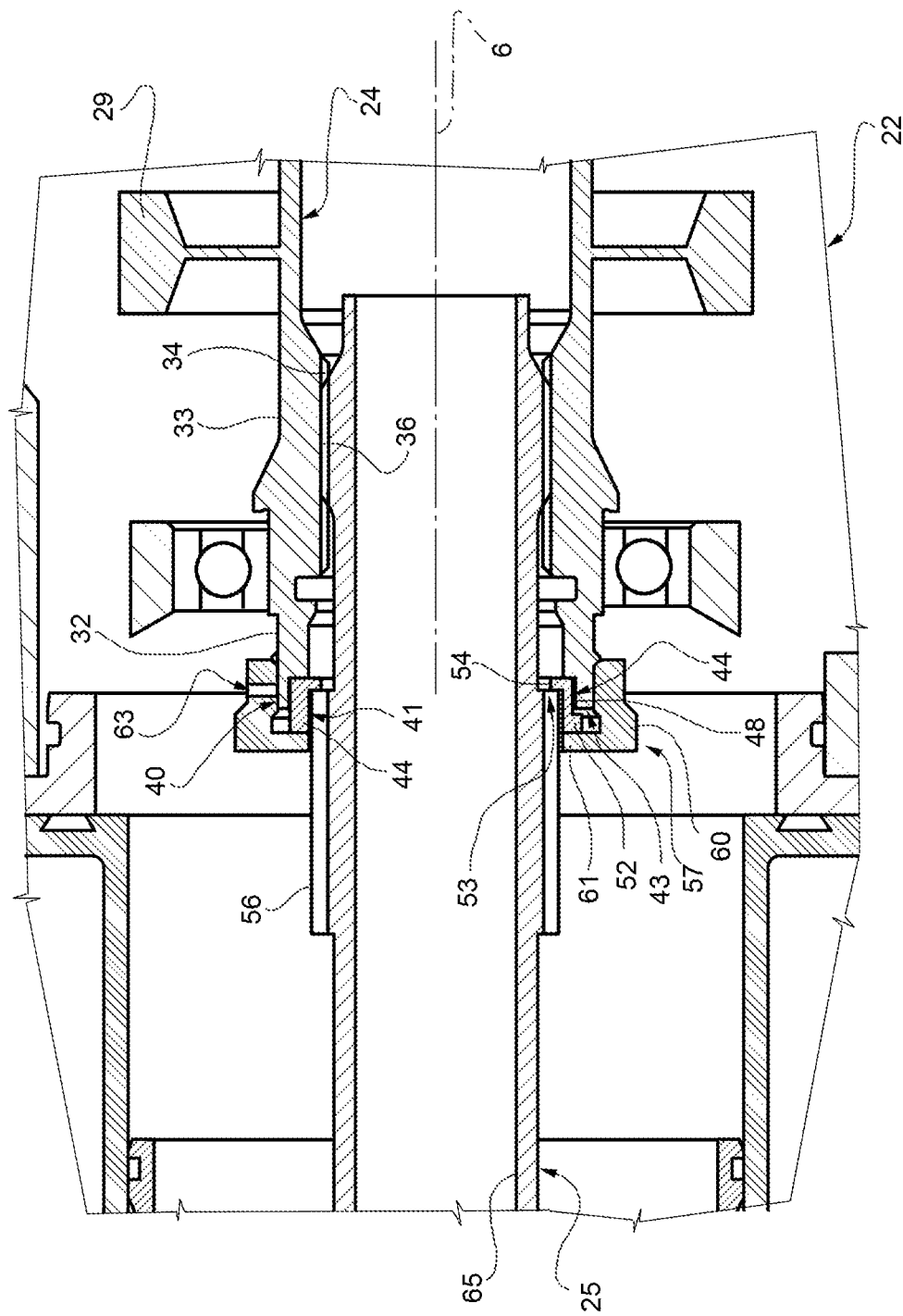
FIGS. 2 and 3 are enlargements of two details in FIG. 1.

As shown in FIG. 2, the portion 32 is radially delimited by an external threaded surface 40 and by an inner surface 41, which extends starting from an axial end face 43 of the shaft 24 and is shaped so as to lock a ring 44 which is at least partially housed in the portion 32 in angular manner.

Figure 4:
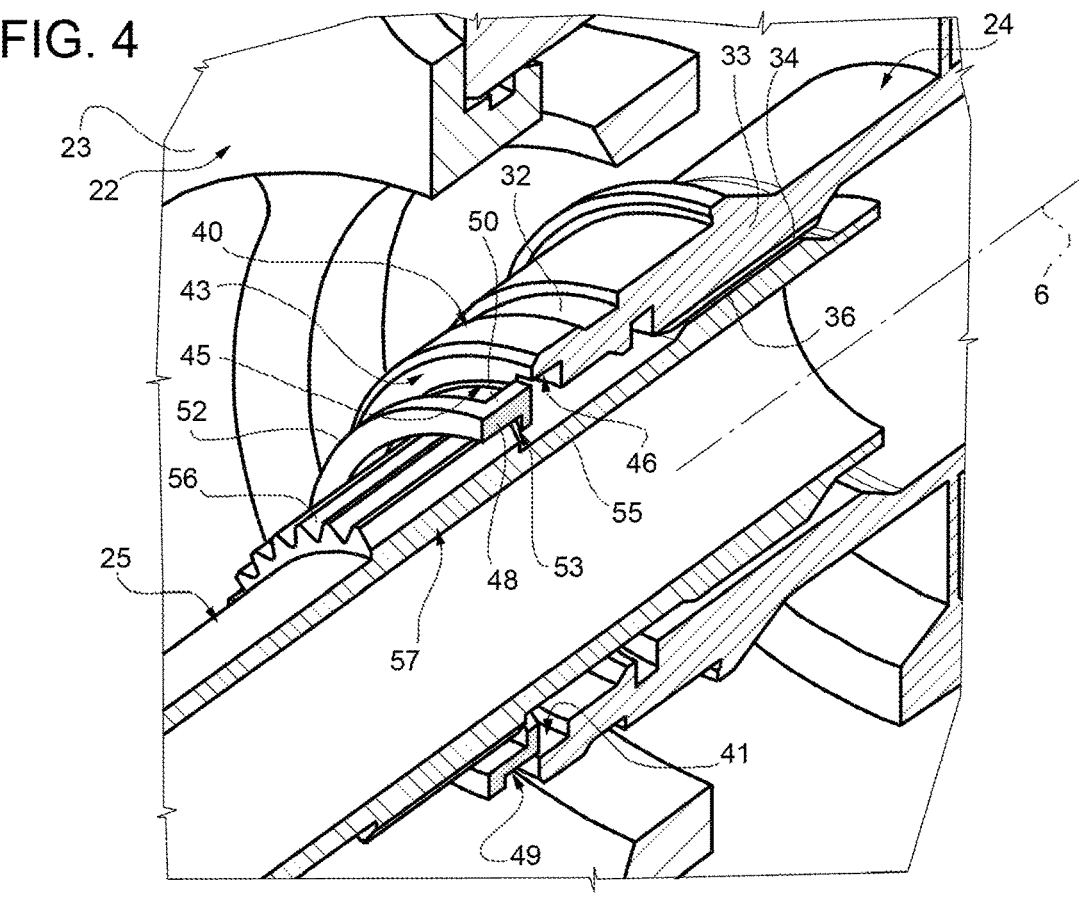
FIG. 4 shows a perspective cutaway view of the detail which is enlarged in FIG. 3, during a step of the disassembly method according to a preferred embodiment of the present invention.

In particular, as shown in FIG. 4, the surface 41 comprises a cylindrical zone 45 and at least one radial notch 46, which axially extends starting from the face 43.

The ring 44 is coaxial to the shafts 24 and 25, axially rests against the portion 32 and comprises an annular wall 48, coupled to the surface 41 in an angularly fixed and axially sliding manner. In particular, the wall 48 has an external cylindrical surface 49, which is substantially complementary with the zone 45, and comprises at least one radial tooth 50, which projects outwards from the surface 49 and engages the notch 46 for keeping the ring 44 angularly locked. Obviously, the number of the notches 46 and of the teeth 50 may be higher. Alternatively to the notch 46 and the tooth 50, different solutions may be provided for the angular locking, e.g. respective flattenings on the surfaces 41 and 49.

The ring 44 further comprises an external flange 52, which projects from an axial edge of the wall 48 and has an external diameter which is greater than the internal diameter of the face 43. The function of the flange 52 is to go against the face 43, and thus prevent the insertion of the ring 44 in the portion 32 if the ring 44 is fitted back to front on the shaft 25 by mistake during the assembly operations of the gearbox 1.

Figure 5:
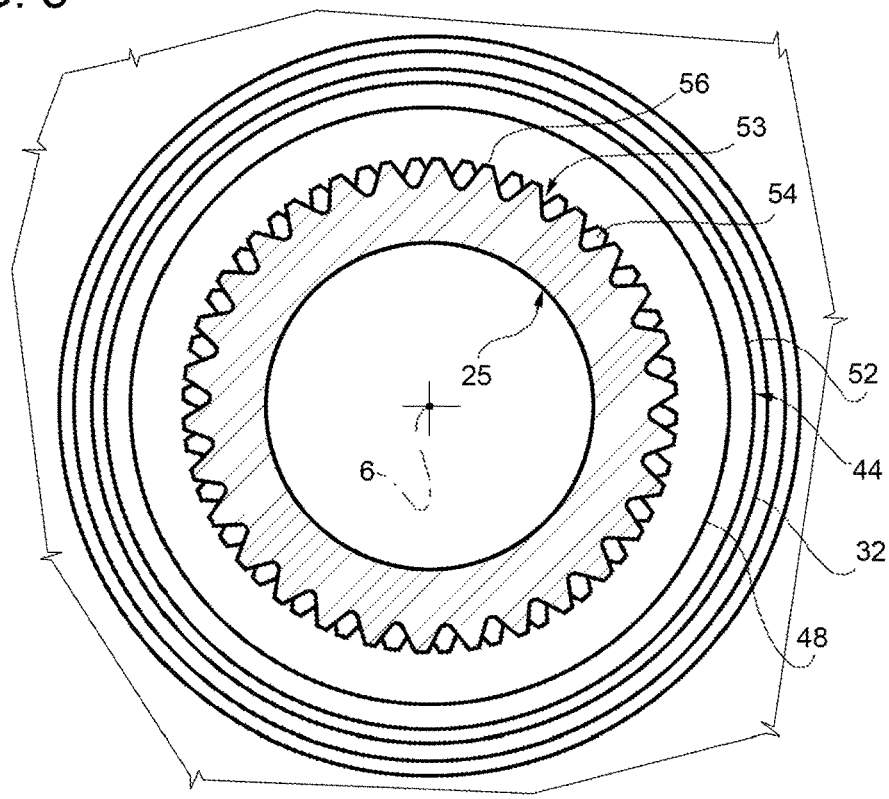
FIG. 5 is an axial view, with a shaft shown in cross section, of a detail in FIG. 4.

The ring 44 further comprises an axial shoulder 53, which is arranged on the opposite axial end of the flange 52, and is advantageously defined by a hole spline or by an inner axial toothing 54, as shown in FIG. 5 and as will be described hereinafter. The toothing 54 surrounds an intermediate portion 55 of the shaft 25 with radial clearance: in other words, the internal diameter of the axial shoulder 53 is greater than the external diameter of the portion 55.

Again with reference to FIG. 4, the portion 55 is preferably cylindrical and axially joins the portion 36 to an external radial projection of the shaft 25, advantageously defined by an axial toothing 56. In particular, the toothing 56 is identical and aligned with a shaft spline of the portion 36, so as to make both at the same time with the same method.

The toothing 56 projects from the portion 55 so as to reach an external diameter which is greater than the internal diameter of the shoulder 53, therefore the latter prevents the toothing 56 and, thus, the shaft 25, from translating axially towards the inside of the shaft 24.

It is thus apparent that the ring 44 and the toothing 56 constitute part of an axial retaining device 57, which prevents the axial sliding of the shaft 25 in direction opposite to the unit 2.

As shown in FIG. 5, if considered viewed along axis 6, the profiles in circumferential direction of the toothing 56 and of the shoulder 53 are shaped so as to be able to slide along axis 6 by the side of each other without interference after a relative rotation, i.e. after a rotation of the ring 44 with respect to the shaft 25. Advantageously, the profile of the toothing 54, in circumferential direction, is complementary with that of the toothing 56, but rotated by an amount substantially equal to half of the angular pitch between two consecutive teeth.

With reference to FIG. 2, the device 57 further comprises an axial locking element 60, which is fixed to the portion 32 in releasable manner and comprises a portion 61 which keeps the ring 40 engaged in the portion 32 in fixed axial position. Preferably, the locking element 60 is defined by a ring nut which is fitted with slight radial clearance about the shaft 25 and is screwed onto the surface 40. In particular, the portion 61 is defined by an inner flange arranged on an axial end of the ring nut 60. Advantageously, the ring nut 60 has one or more radial holes 63 engaged by dowels (not shown), having an end engaging the portion 32 to perform an anti-loosening function on the ring nut 60.

Preferably, the shaft 25 is axially locked with respect to the shaft 24 only one-way, because it is free to translate towards the unit 2. In particular, as shown in FIG. 3, within the unit 2, the shaft 25 has an end 64 which is axially spaced from the flange 18 and has an external diameter which is greater than the internal diameter of the flange 18. Thus, the latter defines a limit stop shoulder for the axial translation of the shaft 25.

Furthermore, the shaft 25 comprises an intermediate portion 65, which axially joins the portion 35 to the toothing 56, substantially has the same external diameter as the portion 55 and carries an external projection 66. The projection 66 projects from the portion 65 so as to reach a diameter which is greater than the internal diameter of the portion 32, and has an axial position such to impede an incorrect back to front assembly of the shaft 25 (i.e. with the end 64 inserted in the shaft 24) during the assembly of the gearbox 1.

As shown in FIG. 1, the portion 65 of the shaft 25, the device 57 and the axial mouth 16 of the shaft 10 remain enclosed by an annular shell 70, which joins the casings 3 and 23, is either openable or removable so as to obtain at least an opening which is axially located between the casings 3 and 23 and can provide access to the device 57 for releasing the shaft 25 from the unit 2 during a disassembly procedure of the gearbox 1.

In particular, the shell 70 is of the telescopic type, because it comprises two sleeves 72,73, which are substantially coaxial to the shaft 25, are fixed in releasable manner to the casings 3 and 23, respectively, and are coupled to each other in axially sliding manner. In practice, the sleeves 72,73 define respective doors, which are axially sliding to define an opening 74 with respect to the casing 3 (FIG. 7) and an opening 75 with respect to the casing 23 (FIG. 6), respectively.

Figure 6:
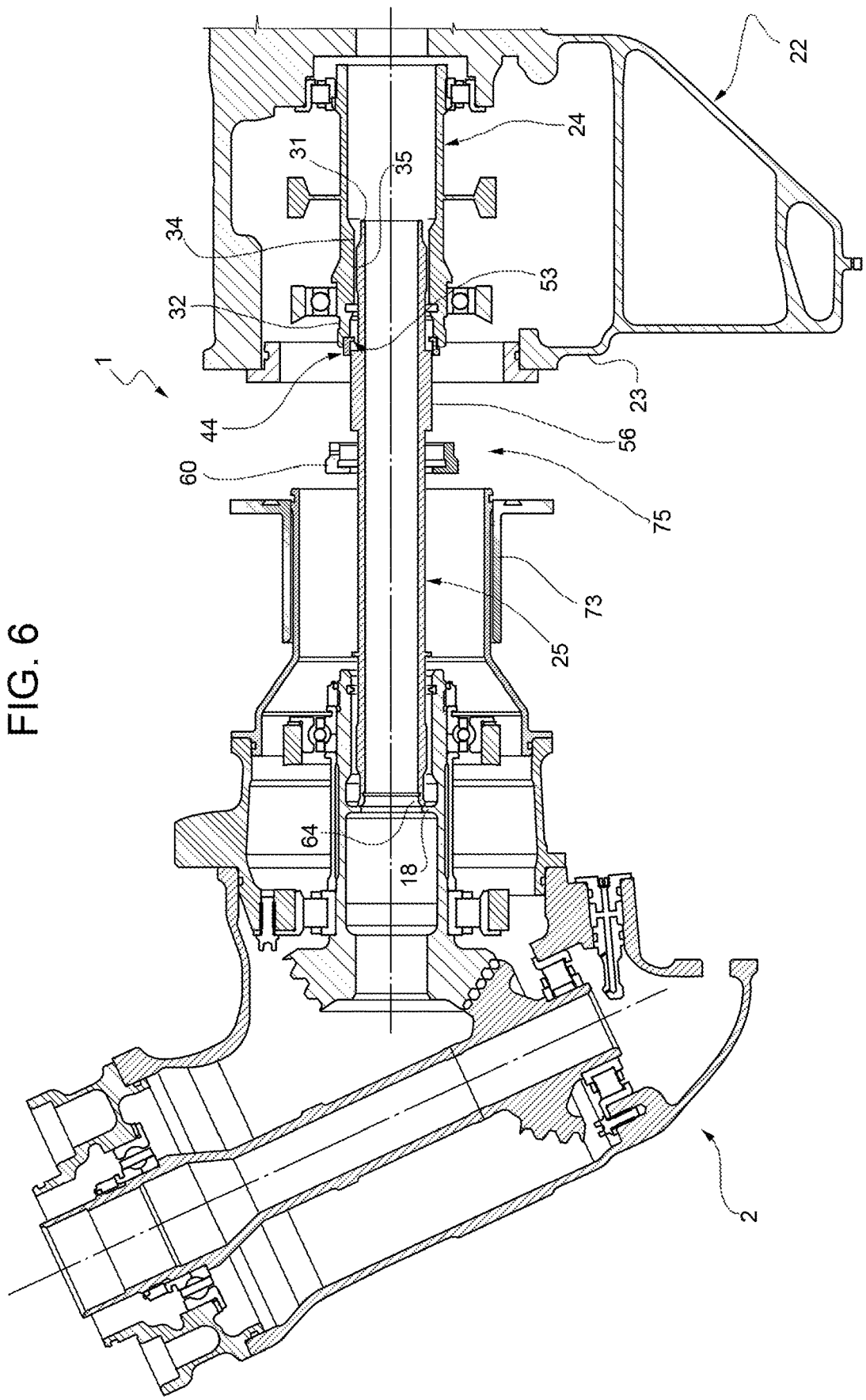
FIGS. 6 and 7 are similar to FIG. 1, and show other steps of the disassembly method.

With reference to FIG. 6, firstly the sleeve 73 is disengaged from the casing 23 and then translated towards the unit 2 so as to form the opening 75 in the disassembly procedure, in order to release the shaft 25 from the unit 2.

Subsequently, the device 57 is released by means of the following operations by manually operating through the opening 75:

the locking element 60 is disengaged and axially spaced from the portion 32, so as to unlock the ring 44 axially;
  the shaft 25 is translated towards the unit 2 so as to extract part of the shaft 25 from the shaft 24; in particular, this translation ends when the end 64 comes into contact with the flange 18; in this manner, the toothing 56 is axially spaced from the shoulder 53 by an amount sufficient to disengage the ring 44 from the portion 32; preferably, the shaft spline of the portion 36 continues to engage the hole spline after this preliminary translation of the shaft 25;

the ring 44 is axially extracted from the portion 32 (FIG. 4) so as to release the rotation of the ring 44 itself; in particular, the ring 44 is taken into contact with the toothing 56 again;

the ring 44 is rotated about the shaft 25 so as to align the toothing 54 axially with the voids of the toothing 56;

finally, the ring 44 is extracted along the toothing 54 so as to move it away from portion 32 axially.

Figure 7:
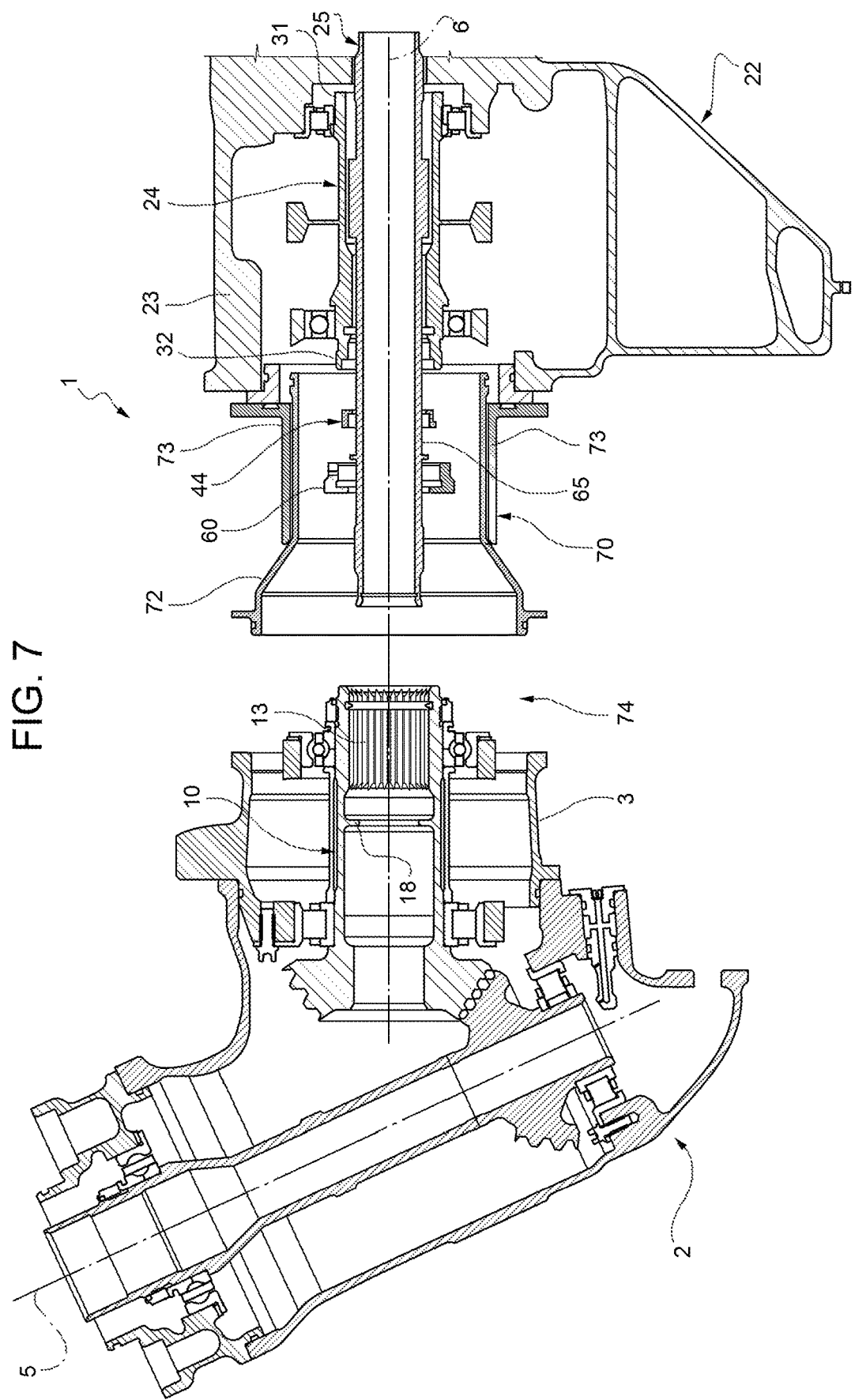

At this point, with reference to FIG. 7, the opening 75 is closed and the sleeve 73 is fixed to the casing 23 again. The opening 74 is then formed by disengaging the sleeve 72 from the casing 3 and moving it axially away. Operating manually through the opening 74, the shaft 25 is translated towards the unit 22, i.e. into the hollow shaft 24, so as to release the shaft 25 from the hole spline 13 of the shaft 10.

It is apparent that, in this condition, the unit 2 is completely separated from the unit 22 and thus may be disengaged and removed, e.g. by means of a translation along axis 5, without interference with the unit 22 or with the shaft 25, while the shaft 25 remains coupled to the unit 22.

From the above, it is apparent that the configuration of the gearbox 1 and, especially, the position of the device 57 allow to release the shaft 25 from the unit 2 without need to remove the accessory assembly and without requiring clearance to operate on the unit 22 from the side of the portion 31, because all the operations are carried out through the clearance which is axially available between the casings 3 and 23. Furthermore, the shaft 25 is disassembled without need to be disassembled into several pieces, because it is simply made to slide along the axis 6, first in one direction to generate a sufficient clearance to disengage the shoulder 53, and then in the opposite direction to remove the shaft 25 from the unit 2 in effective manner.

In addition to relatively small clearance, the disassembly also requires relatively short times for releasing the shaft 25. In particular, there are no bolts or screws to be unscrewed (except for the ring nut 60); there are no connection elements which need to be completely removed (indeed, the ring nut 60 and the ring 44, even after having been disengaged from the portion 32, remain supported by the portion 65, as shown in FIG. 7, without the risk of loosing them in the shell 70 or in the casings 3,23); and, as mentioned above, the shaft 25 does not need to be disassembled into several pieces.

In all cases, the features of the device 57 make the axial retention of the shaft 25 stable and safe, even if only one-way. At the same time, the features of the device 57 allow to have a relatively low number of pieces with respect to the known solutions and thus to have a high simplicity and a high reliability.

Finally, also the construction of the shaft 25 in one piece contributes to keep the number of components low.

From the above, it is apparent that changes and variations may be made to the gearbox 1 without because of this departing from the scope of protection of the appended claims.

In particular, at least in principle, the device 57 could be arranged at the mouth 16, instead of at the portion 32, so as to release the shaft 25 from the unit 22 and insert it in the shaft 10. This solution is preferable when the unit 22 is the one which is normally removed, while the shaft 25 remains coupled to the unit 2.

Furthermore, a two-way locking system may be provided (e.g. with a possible appendix of the ring nut 60 to lock possible axial displacements of the toothing 56 towards the unit 2), instead of a one-way system; and/or the ring nut 60 could be replaced by another axial locking element (e.g. by an element fitted in radial direction on the portion 32 or a bayonet-coupled element).

Furthermore, the shaft and hole splines provided between the shaft 25 and shafts 10,24 could be replaced by other coupling systems which allow an angular constraint and axial sliding freedom in all cases.

Finally, the gearbox 1 could also be used for naval applications, instead of aeronautical applications.

The invention claimed is:

1. A gearbox comprising:
   a main unit comprising:
      a) a first casing;
      b) a first gear transmission; and
      c) a first hollow shaft defining a motion input for said first gear transmission;
   a secondary unit comprising:
      a) a second casing;
      b) a second gear transmission defining a transmission of motion between two axes forming an angle of less than 180°; and
      c) a second hollow shaft defining a motion output for said second gear transmission;
   a drive shaft comprising a first and a second clutch portion, which respectively engage said first and second hollow shafts in an angularly fixed and axially slidable manner to transmit motion from said second gear transmission to said first gear transmission;
   axial retaining means to prevent said drive shaft from translating axially in at least one of the two directions; said axial retaining means being releasable and comprising an axial shoulder supported in fixed position by a portion which is defined by an axial end of one of said first and second hollow shafts and faces the other of said first and second hollow shafts;
   opening means provided between said first and second casing to access said axial end and release said axial retaining means;
   wherein said axial retaining means further comprise an external radial projection, which is part of said drive shaft, is arranged in an intermediate position between said first and second clutch portion and axially faces said axial shoulder so as to prevent said drive shaft from translating axially towards said axial end.

2. The gearbox according to claim 1, wherein the profiles in a circumferential direction of said external radial projection and of said axial shoulder are shaped so as to enable the drive shaft of sliding axially with respect to said axial shoulder in both directions after a relative rotation.

3. The gearbox according to claim 2, wherein said axial retaining means comprise a ring, which comprises said axial shoulder, is arranged around a first intermediate portion of said drive shaft and is releasably fixed to said axial end.

4. The gearbox according to claim 3, wherein said ring has a hole spline defining said axial shoulder.

5. The gearbox according to claim 3, wherein said ring is coupled to said axial end in an axially sliding and angularly fixed manner; said axial retaining means comprising an axial locking means that keep said ring in an axially fixed position with respect to said axial end.

6. The gearbox according to claim 3, wherein said axial end is axially delimited by an end face and radially delimited by an inner surface; said ring comprising:
   an annular wall engaging said inner surface in an angularly fixed and axially sliding manner, an external flange, which projects from an axial edge of said annular wall and has an external diameter greater than the internal diameter of said end face.

7. The gearbox according to claim 1, wherein said external radial projection is defined by an axial toothing identical to and aligned with a shaft spline defined by said first clutch portion.

8. The gearbox according to claim 1, wherein said axial retaining means are configured so as to prevent the axial translation of said drive shaft only towards said axial end.

9. The gearbox according to claim 1, wherein said other of said first and second hollow shafts comprises an inner projection, which is axially spaced from said drive shaft and axially faces said drive shaft so as to define a limit stop shoulder.

10. The gearbox according to claim 1, wherein said drive shaft comprises a second intermediate portion provided with a further external radial projection having dimensions and axial position such as to prevent back to front assembly of said gearbox.

11. The gearbox according to claim 1, wherein said opening means are defined by an annular shell, which joins said first and second casing and is openable or removable.

12. The gearbox according to claim 11, wherein said annular shell comprises at least one closing element that is axially slidable to open an access towards the inside of said annular shell.

13. A disassembly method for disengaging a drive shaft in a gearbox made according to claim 1, the method comprising the steps of:

forming at least one opening between said first and second casing;

accessing said axial end through said opening to release said axial retaining means without disassembling said drive shaft; the release of said axial retaining means comprising the following steps:
  a) partly extracting said drive shaft from said axial end so as to axially space said external radial projection from said axial shoulder;
  b) disengaging said axial shoulder from said axial end;
  c) rotating said axial shoulder, with respect to said drive shaft, so as to prevent interference in axial direction with respect to said external radial projection;

axially translating said drive shaft towards said axial end, by operating through said opening, so as to disengage said drive shaft from said other of said first and second hollow shaft, without disassembling said drive shaft.

14. The disassembly method according to claim 13, wherein disengagement of said axial shoulder is carried out by:
  releasing axial locking means, and
  axially extracting said axial shoulder from said axial end.

15. The disassembly method according to claim 13, wherein, after rotation of said axial shoulder and before translation of said drive shaft, said axial shoulder is moved away from said axial end, with an axial sliding along said external radial projection.

* * * * *